United States Patent [19]

Clenney

[11] 4,140,881
[45] Feb. 20, 1979

[54] TELEPHONE LOOP EXTENDING APPARATUS

[76] Inventor: Richard W. Clenney, 812 59th St., NW., Bradenton, Fla. 33505

[21] Appl. No.: 775,429

[22] Filed: Mar. 8, 1977

[51] Int. Cl.² ............................................. H04M 1/76
[52] U.S. Cl. .................................................. 179/16 F
[58] Field of Search ........... 179/16 AA, 16 F, 18 FA, 179/81 C, 84 L, 16 A, 18 F

[56] References Cited

U.S. PATENT DOCUMENTS

| | | | |
|---|---|---|---|
| 3,504,127 | 3/1970 | Slana | 179/16 F |
| 3,508,009 | 4/1970 | Henry et al. | 179/16 F |
| 3,626,101 | 12/1971 | Fitzsimons et al. | 179/16 F |
| 3,757,052 | 9/1973 | Tothill | 179/16 F |
| 3,783,198 | 1/1974 | Couch | 179/18 FA |
| 3,828,139 | 8/1974 | Chambers, Jr. | 179/16 F |
| 3,872,258 | 3/1975 | Chambers, Jr. | 179/16 F |
| 3,889,066 | 6/1975 | Simokat et al. | 179/16 F |
| 4,024,351 | 5/1977 | Ingle | 179/16 F |

OTHER PUBLICATIONS

General Electric Optoelectronics Manual, W. H. Sahm, General Electric Co., 1976, p. 72.

*Primary Examiner*—Kathleen H. Claffy
*Assistant Examiner*—Randall P. Myers
*Attorney, Agent, or Firm*—Jones, Thomas & Askew

[57] ABSTRACT

An electrical apparatus for use with telephone equipment to extend the effective length of an electrical circuit such as a subscriber loop or the like. The disclosed apparatus includes a variable resistance in shunt across the loop between the central office and a subscriber station, and also includes a sensor which senses the level of current in the loop and varies the shunt resistance in response thereto. When installed with the central office telephone switching equipment, the disclosed apparatus supplements the sensed current level in the loop, thereby increasing the distance from which subscriber station stations may be connected to the central office or enabling the use of telephone loops having greater internal resistance.

6 Claims, 1 Drawing Figure

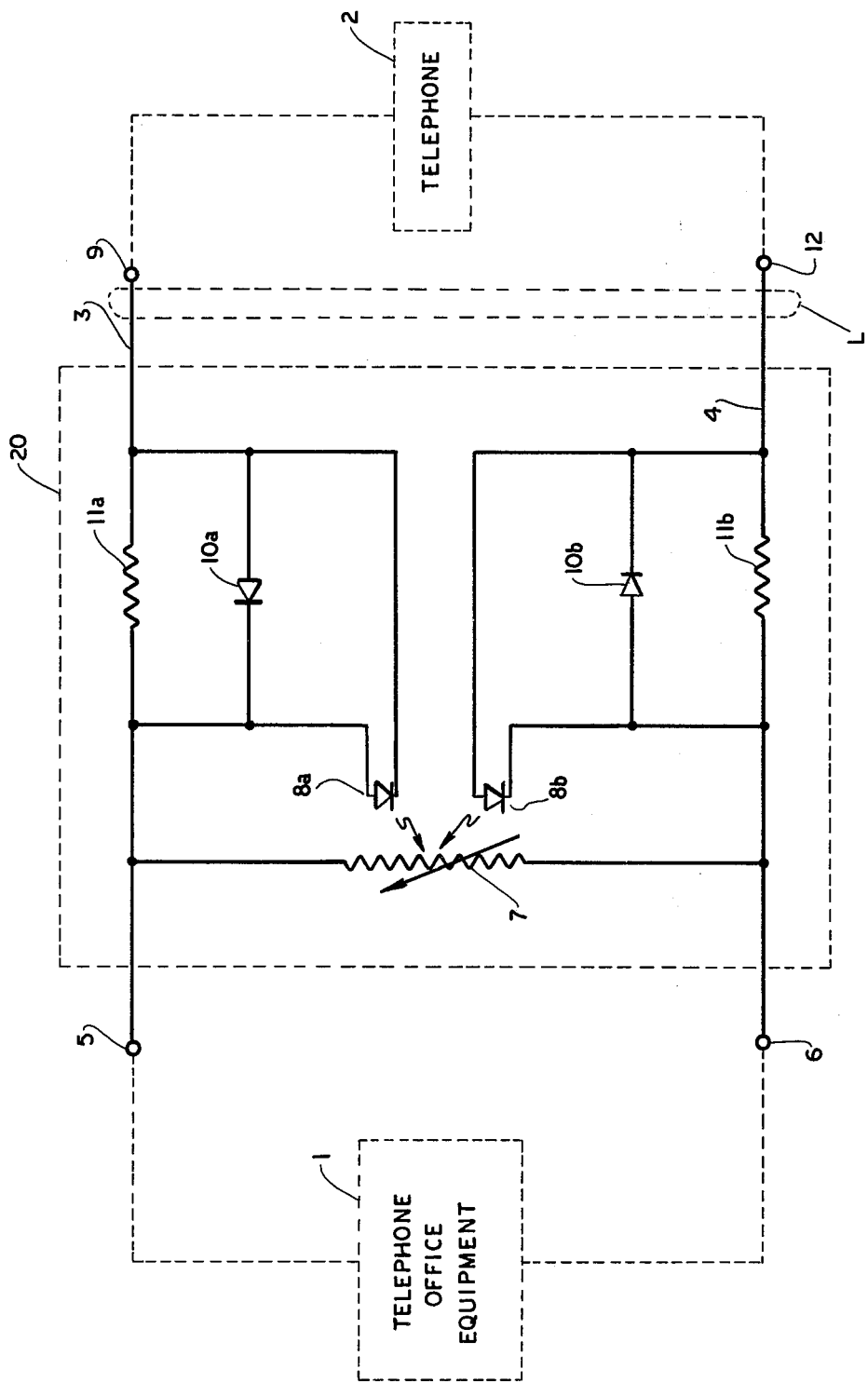

TELEPHONE LOOP EXTENDING APPARATUS

BACKGROUND OF THE INVENTION

The present invention relates to the art of transmission of electrical signals, particularly telephone signals, through lines having internal resistance, for the purpose of powering relays, switching equipment or the like.

Telephone subscriber stations are electrically connected to centrally located switching equipment which, in response to electrical signals caused by the operation of equipment associated with the subscriber station, perform the function of placing the subscriber station into electrical communication with either another desired subscriber station or with further switching equipment which places the subscriber station into electrical communication with another desired subscriber station. The voltage source for the electrical signals is located at the central office, and electrical current flows between the subscriber stations and central office along loops having an internal resistance. At the telephone subscriber station, the loop is interrupted by an open circuit which is only closed in response to the operation of the control and selection functions of the subscriber station. By way of example, placing a telephone off-hook causes current to flow in the subscriber loop for the purpose of signaling the central office that a line is desired. When a rotary-dial telephone is dialled, the make-break dial action causes "dial pulses" of current to flow through the subscriber loop to actuate switching equipment at the central office. In either case, the flow of current in the loop provides electrical signals which operate equipment at the central office.

The electrical signals in the subscriber loop must have sufficient power to be capable of powering the necessary relays or the like at the central office. However, the transmission of electrical current from the central office switching equipment through the subscriber loop to the subscriber station and back to the central office switching equipment results in a power loss due to the distributed internal resistance of the loop itself. Thus, the length of the loop and the gauge and material of the line combine to create a distributed internal resistance which imposes practical limitations on the length of the subscriber loops that can be used to connect subscriber stations to the central office, on the types of materials that can be used for subscriber loops, and also the cross-sectional diameter, i.e., gauge, of the subscriber loops that can be used between the central office switching equipment and a subscriber station located a given distance from the central office. The effects of this practical limitation may be to preclude extending telephone service to a prospective subscriber, or to require subscriber loops which are either of a larger and most costly gauge or are made from a more costly material.

It has been known in the art to install a device known as a "loop extender" at some location in a subscriber loop to permit connection of a subscriber station which would ordinarily be located at too great a distance to provide reliable signals to the central office switching equipment. A common type of prior art loop extender is illustrated by the voltage booster devices described in U.S. Pat. Nos. 3,872,258 and 3,757,052. These devices increase the voltage on the loop, thereby providing the potential for an increased current level in the "extended" loop.

The voltage booster loop extenders described above presented a number of problems in their ordinary commercial use. Initially, the voltage booster loop extenders of the prior art tend to be expensive and add considerably to the cost of installation of a subscriber station at a long distance from the central office. Further, the voltage booster loop extenders required elaborate circuits to permit reverse-polarity or "reverse battery" supervision at the central office to cause a reverse current to flow in the loop.

Additionally, more sensitive relays have been used in the past in the switches of the central office equipment. However, the substitution of more sensitive relays may also be costly, and affects the uniformity and interchangeability of the central office switching equipment.

SUMMARY OF THE INVENTION

The present invention functions to "extend" a circuit such as a subscriber loop by sensing the presence of the current which flows in the "extended" loop when the loop circuit is completed at the subscriber set, and by responsively providing another current flow path at the central office in parallel with the loop. The current flowing through the parallel path supplements the loop current and provides the additional current necessary to power the central switching office equipment.

As is apparent from the above description and as will be more apparent from consideration of the accompanying drawings and detailed description of a preferred embodiment, it is an object of the present invention to provide an improved loop extender.

It is also an object of the present invention to provide a small, low-cost loop extender which can be easily installed at a central office switching circuit.

It is another object of the present invention to provide a loop extender which does not include an external voltage source or voltage booster.

A further object of the present invention is to provide a loop extender which may be easily adapted to permit reverse polarity at the central office equipment to cause a reverse current in the loop.

Other objects and advantages of the present invention will be apparent from the following detailed description taken in conjunction with the accompanying drawings, in which:

The FIGURE is a schematic drawing of a telephone system, including a telephone central office switching circuit, a preferred embodiment of the loop extender of the present invention, a telephone subscriber station, and the electrical connections therebetween.

DETAILED DESCRIPTION OF PREFERRED EMBODIMENT

A preferred embodiment of the loop extender of the present invention is shown in the FIGURE. The preferred embodiment of the loop extender of the present invention, which preferred embodiment will be hereinafter referred to as the loop extender, comprises a loop extender for use in conjunction with a telephone message transmission system including telephone central office switching equipment 1 being electrically connected to at least one telephone subscriber station 2 by a loop L having a first line 3 and a second line 4. It will be understood, however, that the utility of a loop extender of the present invention is not limited to use in conjunction with a telephone message transmission system. The present invention may be used in any electrical circuit in which it may be necessary to provide an apparatus for: (1) detecting the presence and magnitude of a loop current through a loop circuit connected across a voltage source; and (2) supplementing the loop current by a current through a variable shunt resistance, variably responsive to the magnitude of the detected loop current, connected across the voltage source in parallel with the loop. Thus, the present invention provides an apparatus for increasing the power output provided by the voltage source to the circuit at the junction of the loop and the variable shunt resistance.

As is described above and is well-known in the art of telephone communication, the central office switching circuit 1 provides a battery voltage across which the preferred embodiment of the loop extender is to be electrically connected. The central office switching circuit 1 places a suitable battery voltage on a first line 3 and through the telephone subscriber station 2 to a second line 4 by the connection of the first line 3 to the telephone central office switching circuit 1 at the tip 5, and by the second line 4 to the telephone central office switching circuit 1 at the ring 6. As is known in the art, the voltage which is present at the tip 5 and the ring 6 may be less than the nominal battery voltage, e.g., 48 volts, because of the voltage drop occurring in additional electrical devices, such as relays and switches, which are connected to the common battery at the central office in series with the loop L. The telephone subscriber station 2 is conventionally comprised of switches including the hook switch, a rotary dial (if present) and the like which, when conventionally operated, control the DC current passage through the loop L to the telephone central office switching circuit 1 to operate further switches and relays in the telephone central office switching circuit 1.

As described above, the basic connection between the telephone central office switching circuit 1 and the telephone subscriber station 2 is through the loop circuit L comprised of lines 3 and 4. The level of current through the loop circuit is dependent upon the voltage placed upon it by the central office switching circuit 1 between the tip 5 and the ring 6, the distributed internal resistance on lines 3 and 4, and the resistance at the subscriber station 2. As described above, the voltage at the central office switching circuit 1 between the tip 5 and the ring 6 may vary depending upon the electrical state of switches and relays in the central office switching circuit 1. The resistance at the subscriber station 2 will vary dependent upon the opening and closing of switches at the subscriber station 2 by the telephone subscriber. The distributed resistance along the loop L itself, i.e., first line 3 and second line 4, is, however, an unavoidable and generally undesirable by-product of the length of the loop, i.e., the combined lengths of first line 3 and second line 4, the cross-sectional diameter or gauge of the line used for first line 3 and second line 4, and the internal resistivity of the material from which input line 4 and output line 5 are made. Having described the telephone environment in which the disclosed embodiment of the present invention is to operate, the following detailed description of the disclosed embodiment will reveal how the present invention offsets both the undesirable effects of insufficient loop current resulting from causes such as loop resistance, insufficient voltage between the tip 5 and the ring 6, or the like.

The preferred embodiment of the loop extender 20 comprises a variable shunt resistance 7 placed in parallel with the loop L across the voltage provided by the central office switching circuit 1 across tip 5 and ring 6. The resistance of the variable shunt resistance 7 is responsive to a means for sensing the amount of current flow in the loop L. The variable resistance 7, in the disclosed embodiment, is provided by a photosensitive resistor which is placed in shunt across first line 3 and second line 4 of the loop L. The level of current flow in the loop L is sensed by a resistor 11a placed in series along the first line 3 of the loop L and in parallel with a light emitting diode 8a which is optically coupled with the photosensitive resistor 7; and a resistor 11b placed in series along the second line 4 of the loop L and in parallel with a light emitting diode 8b which is also optically coupled with the photosensitive resistor 7.

In addition, as will be further explained below, the diode 10a in shunt with the light emitting diode 8a and the resistance 11a, and the diode 10b in shunt with the diode 8b and the resistance 11b, provide a path for the flow of reverse current through the loop L. The diodes 10a and 10b are connected so that no loop current flows through these diodes while normal battery polarity is maintained on the loop L. However, when reverse-battery voltage is applied to the loop L, loop current can flow through the diodes 10a and 10b in shunt across the respective light emitting diodes 8a and 8b. Although light emitting diodes normally should not emit illumination in response to reverse-direction current flow, the shunt diodes 10a and 10b insure uniformity of reverse-current operations.

The operation of the preferred embodiment of the loop extender of the present invention is best understood by reference to the physical principles relating to the equivalent resistance of two or more resistors in parallel. In a circuit in which a voltage source is connected across two resistances in parallel, the total current flow from the voltage source through the parallel circuit is determined by the equivalent resistance of the parallel circuit as seen by the voltage source according to the following relationship:

$$I \text{ total} = V/R_{eq}$$

where I total is the total current from the voltage source through the parallel circuit, V is the voltage at the voltage source, and Req is determined by the values of R1 and R2, the parallel resistances, according to the relationship $R_{eq} = (R1)(R2)/(R1 + R2)$.

The preferred embodiment of the loop extender of the present invention makes use of this relationship by placing a variable shunt resistance, the photo-sensitive resistor 7, in parallel with the sum of the resistances along the loop L, i.e., the resistors 11a and 11b, the resistance at the subscriber station 2, and the distributed internal resistance along the loop L. By adjustment of the resistance of the variable shunt resistance 7, the equivalent resistance seen by the voltage between the tip 5 and the ring 6 is reduced and the total amount of current from the tip 5 of the central office switching circuit 1 to the ring 6 of the central office switching circuit 1 is increased above the current which would otherwise flow through the subscriber loop L. This increased current flow through the central office switching equipment 1 increases the power available to operate the relays or other switching equipment of the central office switching circuit.

The value of the resistance of the photo-sensitive resistor 7 is dependent upon the outputs from the light emitting diodes 8a and 8b to which the photo-sensitive resistor 7 is optically coupled. Initially it should be noted that the light emitting diodes 8a and 8b are polarized in the circuit of the preferred embodiment of the present invention to produce illumination only when current flows in the normal-battery current from the tip 5 of the central office switching circuit 1 to the ring 6 of the central office switching circuit 1, and the shunting effect of the parallel diodes 10a and 10b as noted above ensures that reverse-battery current cannot illuminate the light-emitting diodes. Moreover, it will be understood by those skilled in the art that light emitting diodes require a minimum voltage across their input and output leads before they will become operable to emit light. In the preferred embodiment of the present invention the necessary minimum voltage is established across light emitting diodes 8a and 8b by the flow of current through resistors 11a and 11b, respectively. As will be described more fully below, the values for resistances 11a and 11b may be chosen such that a predetermined level of current flow through the loop L is required to provide the minimum voltage drop across the resistances 11a and 11b at which the light emitting diodes produce illumination. The selection of the resistances 11a and 11b thereby establishes a threshold current level below which the light emitting diodes 8a and 8b will not cause the resistance of the photo-sensitive resistance 7 to decrease. In this manner the loop extender is prevented from prematurely causing a supplementary current to flow back to the ring 6 of the central switching circuit 1 when the relatively low level of current necessary to provide a ringing signal to the subscriber station flows through subscriber loop L.

The light output of the light emitting diodes 8a and 8b is dependent upon the voltage across the resistances 11a and 11b, respectively, and hence upon the current flow through the subscriber loop L. Thus, as the flow of current through the subscriber loop increases above the threshold current level, the light emitting diodes 8a and 8b will begin to emit light and, as the current increases, the light emitted by the light emitting diodes 8a and 8b will increase.

The light emitting diodes 8a and 8b are optically coupled to the photo-sensitive resistor 7. In the absence of light from the light emitting diodes 8a and 8b, the resistance of the photo-sensitive resistor 7 is at its greatest value. As light is generated by the light emitting diodes 8a and 8b and impinges upon the photo-sensitive resistor 7, the resistance of the photo-sensitive resistor 7 decreases in inverse proportion to the amount of illumination which impinges the photo-sensitive resistor 7. As the resistance of the photo-sensitive resistor 7 decreases, the current through the photo-sensitive resistor 7 increases and combines with the current from the subscriber loop L to provide a supplemented current flow through the central office switching circuit 1. The magnitude of the supplemented current may be predicted based upon the effect which the reduction of the resistance of the photo-sensitive resistor 7 has on equivalent resistance seen by the central office switching circuit 1 across the tip 5 and ring 6.

As has been described above, the initial flow of current through the subscriber loop L in excess of the threshold current level causes the resistance of the photo-sensitive resistor 7 to decrease, thereby decreasing the value of the equivalent resistance between tip 5 and the ring 6. The decrease in the equivalent resistance causes the central office switching circuit 1 to receive an increased flow of current comprised of the current through the subscriber loop L and the supplementary current through the photo-sensitive resistor 7 of the loop extender 20. As the current through the central office switching circuit 1 is thereby increased, the internal voltage drops within the central office switching circuit 1 also increase as a result of the increased flow of current through the central office switching equipment, such as switches and relays. The increased internal voltage drop within the central office switching circuit 1 causes the voltage across the tip 5 and the ring 6 to decrease, thereby decreasing the flow of current through the subscriber loop L. This decrease in the flow of current through the subscriber loop L reduces the voltage drop across the resistances 11a and 11b, so that the light emitted from the light emitting diodes 8a and 8b decreases. Correspondingly, the resistance of the photo-sensitive resistor 7, which is inversely proportional to the light emitted, is increased, raising the equivalent resistance across the tip 5 and the ring 6. The increased shunt resistance of the photo-sensitive resistor 7 provides a corresponding reduction in supplemental current drawn from the central office, and that decrease in current flow causes the internal voltage drop caused by the flow of current through the central switching circuit 1 to decrease, thereby slightly increasing the voltage across tip 5 and ring 6 and thus increasing the current flow through the subscriber loop L. These self-adjustments in current continue until the current stabilizes at a value determined by the parameters of the central office circuit and subscriber loop.

It will now be understood to those skilled in the art that the loop extender of the present invention is operated by the detection of a threshold minimum current level in the loop, whereupon the loop extender supplements the detected current and adjusts the equivalent resistance of the subscriber loop L as seen by the central office switching circuit 1 to provide and establish a suitable current level for the operation of the electrical components in the central office switching circuit 1.

Typically, the preferred embodiment of the loop extender of the present invention is operated in the context of the telephone system as follows. A typical subscriber loop may have resistance in the order of 1500 ohms. When the receiver (not shown) at the subscriber station 2 is in the on-hook condition, the subscriber loop L is effectively an open circuit to DC current flow. Thus, before the receiver at the subscriber station 2 is taken off-hook, no current flows through the subscriber loop L. Similarly, an inconsequential current flows through the relatively large resistance at the photo-sensitive resistor 7, typically 1 to 2 megohms, in the absence of illumination from the light emitting diodes 8a and 8b. An AC ringing signal may be transmitted through the subscriber loop L from the central office switching circuit 1 to the subscriber station 2; however, the value of the resistors 11a and 11b should be chosen such that the AC current associated with the ringing signal flowing through the subscriber loop L is below the threshold current level needed to develop the voltage drops across resistors 11a and 11b needed to illuminate the light emitting diodes 8a and 8b.

Once the receiver at the subscriber station 2 is taken off-hook, a DC path through the subscriber loop L is established and current flows through the subscriber loop to operate light emitting diodes 8a and 8b as has been described above. When the rotary dialing mechanism (not shown) at the subscriber station 2 is operated, the alternating make-break dial operation places dial pulses of current on the output line 4, and the photo-sensitive resistor 7 of the loop extender correspondingly supplements the current in the output line 4 by generating pulses of supplementary current in response to the periodic dial pulses of DC current flowing through the subscriber loop 1.

As will be apparent from the foregoing description, the photo-sensitive resistor 7 could be coupled with only one light emitting diode which may be placed either across the first line 3 or the second line 4 at a point beyond the photo-sensitive resistor 7 since a light-emitting diode so positioned would adequately detect the flow of current through the subscriber loop L. However, in the preferred embodiment described above, two light emitting diodes 8a and 8b are disclosed to be in electrically balanced relationship across both the first line 3 and second line 4 of the loop. The balancing of the elements of the loop extender is desirable since it reduces the noise on the loop; however, the loop extender may comprise only one light emitting diode optically coupled with the photo-sensitive resistor 7 and positioned so as to detect the level of current flow in the subscriber loop.

Once the receiver at the subscriber station 2 is placed in the on-hook position, the flow of current through the loop is reduced to its initial level, generally zero current in the case of a telephone subscriber loop. The decrease in current level through the loop causes the light emitting diodes 8a and 8b to cease emission of light, thereby causing the resistance of the photo-sensitive resistor 7 to increase again to its maximum value and the supplementary current to the central office switching circuit 1 through the photo-sensitive resistor 7 to substantially diminish to its initial inconsequential level.

Should the polarity at the central office switching circuit 1 be reversed, as when a supervisory control signal is sent from the central switching office to the subscriber station 2, the light emitting diodes 8a and 8b are short-circuited by the diodes 10a and 10b with which the light emitting diodes 8a and 8b are connected in parallel, respectively. Reverse-battery current is thus permitted to flow through the loop L without impairment by the added loop extender 20, and without any possibility of illuminating the light-emitting diodes.

It will be understood by those skilled in the art that the absence of voltage sources in the loop extender permits loop testing through the loop extender. Thus, the loop extender need not be removed or bypassed in the normal loop testing procedures.

It will now be understood by those skilled in the art that a preferred embodiment may be constructed and operated according to the present invention for use in telephone communication systems. However, the present invention may be used in any electrical circuit in which it is desired to detect the presence and magnitude of a current in a circuit connected across a common voltage source and to increase the power drawn from the voltage source in response to the presence and magnitude of current flow through the circuit by further increasing the flow of current from the voltage source. Thus, the foregoing description of the preferred embodiment has been made only for illustrative purposes and the scope of the present invention is limited only by the appended claims.

What is claimed is:

1. Apparatus for adjusting the amount of current drawn from a telephone central office voltage source in order to operate central office equipment in response to current in a subscriber loop circuit, said loop circuit being formed by a first line from the central office to the subscriber station and a second line from the subscriber station back to the central office, comprising:

a pair of light-emitting means connected in series in said loop circuit, one of said light emitting means being in series with said first line and the other of said light-emitting means being in series with said second line, said means being operative to conduct loop current and to produce radiation in response to said loop current;

variable resistance means connected across said first and second lines in parallel with said loop circuit, at a location between said central office and said subscriber station; and means optically coupling the radiation output of said light-emitting means with said variable resistance means such that the resistance of said variable resistance means is lowered in response to said radiation produced in response to a certain amount of current flowing in said loop circuit.

2. Apparatus as in claim 1, wherein:

each of said light-emitting means comprises a light-emitting diode polarized to conduct said loop current in a forward direction in said loop; and further comprising:

a diode separately connected in shunt across each said light-emitting diode;

each of said shunt diodes being polarized so that only loop current in a reverse direction which is opposite to said forward direction can flow through said shunt diodes, so that light is produced by said light-emitting diodes to lower the resistance of said variable resistance means only in response to the flow of current in said forward direction, and so that loop current in said reverse direction can flow unimpeded by said light-emitting diodes.

3. Apparatus as in claim 2, further comprising:

a pair of resistances respectively connected in series in each of said first and second lines;

said light-emitting diode and said shunt diode in each of said first and second lines being connected in parallel with said resistance in said respective lines; and each of said resistances being selected so that the voltage drop across each resistance is sufficient to cause said parallel-connected light-emitting diodes to emit illumination sufficient to lower the resistance of said variable resistance only in response to loop current which exceeds a predetermined threshold level.

4. Apparatus for adjusting the amount of current drawn from a telephone central office voltage source in order to operate central office equipment in response to current in a subscriber loop circuit, said loop circuit being formed by a first line from the central office to the subscriber station and a second line from the subscriber station back to the central office, comprising:

a pair of light-emitting means connected in series in said loop circuit, one of said light-emitting means being in series with said first line and the other of said light-emitting means being in series with said second line, said means being operative to conduct loop current and to produce light in response to said loop current;

photosensitive resistance means optically coupled to each of said light-emitting means, and electrically connected in parallel with said loop circuit between said central office and said subscriber station; and the resistance of said photosensitive resistance means being inversely proportional to the illumination provided by said light-emitting means in response to said loop current, so that the effective resistance of said loop circuit is lowered in response to a selected amount of current flowing in said loop circuit.

5. Apparatus as in claim 4, wherein:

each of said light-emitting means comprises a light-emitting diode polarized to conduct said loop current in a forward direction in said loop; and further comprising:

a diode separately connected in shunt across each of said light-emitting diodes;

each of said shunt diodes being polarized so that only loop current in a reverse direction which is opposite to said forward direction can flow through said shunt diodes, so that light is produced by said light-emitting diodes to lower the resistance of said variable resistance means only in response to the flow of current in said forward direction, and loop current in said reverse direction can flow unimpeded by said light-emitting diodes.

6. Apparatus as in claim 5, further comprising:

a pair of resistances respectively connected in series in each of said first and second lines;

said light-emitting diode and said shunt diode in each of said first and second lines being connected in parallel with said resistance in said respective lines; and each of said resistances being selected so that the voltage drop across each resistance is sufficient to cause said parallel-connected light-emitting diodes to emit illumination sufficient to lower the resistance of said variable resistance only in response to loop current which exceeds a predetermined threshold level.

* * * * *